July 26, 1966 C. M. SWEET 3,262,475
WOOD SAWS WITH HOLES FOR DISPOSING OF THE SAW DUST
Filed Jan. 29, 1962
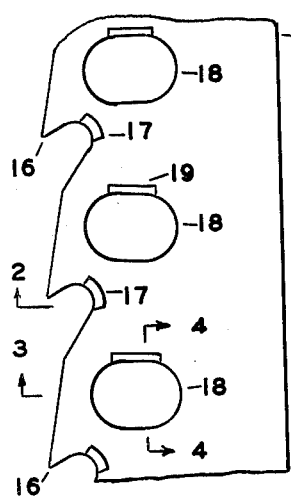
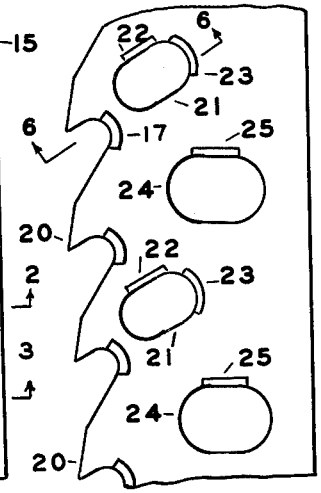
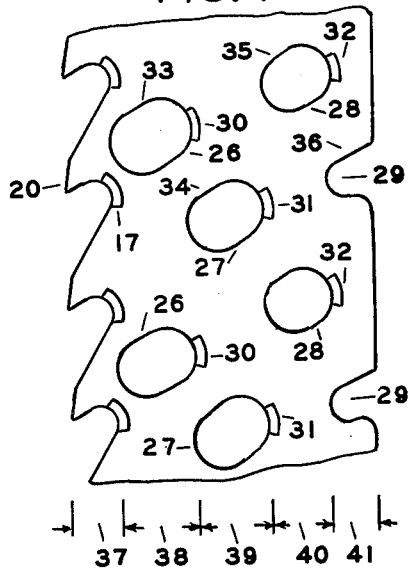
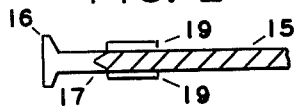
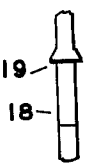
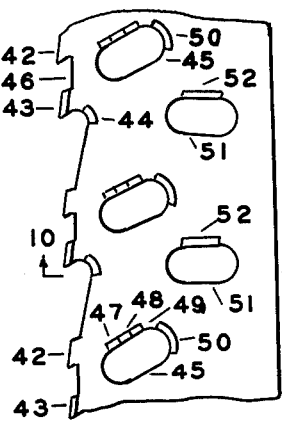
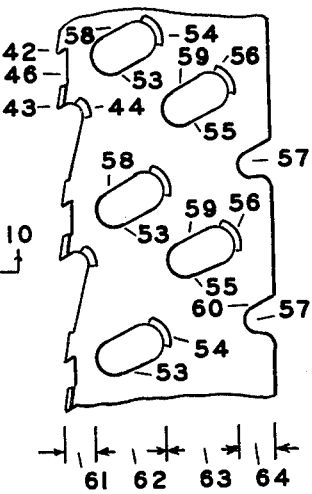
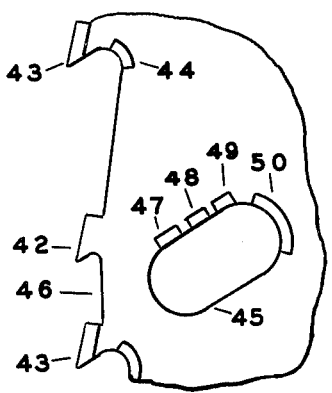
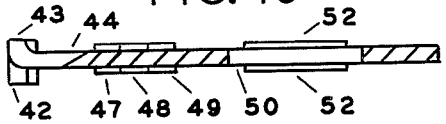
INVENTOR.
Corliss M. Sweet
BY

United States Patent Office 3,262,475
Patented July 26, 1966

3,262,475
WOOD SAWS WITH HOLES FOR DISPOSING OF THE SAW DUST
Corlise M. Sweet, 1000 E. Montana St., Milwaukee, Wis.
Filed Jan. 29, 1962, Ser. No. 169,368
14 Claims. (Cl. 143—133)

This invention is a continuation-in-part of application Serial Number 848,452 filed October 23, 1959, now abandoned. It relates to saws for cutting a thinner kerf in wood and it describes in more detail saws with holes in the blade that were partially described in application Serial Number 848,452.

One authority has stated that in the manufacture of lumber in this country four to six billion board feet of lumber is made into saw dust each year. Some of this saw dust is used and much of it is waste.

It is therefore an object of this invention to show a thinner saw that will cut less saw dust in cutting a board from a timber and thereby conserve our timber resources.

Another object is to show a new method of disposing of the saw dust cut by the saw teeth thereby allowing the saw teeth to be made smaller and the blade thinner.

A further object is to show how less expensive band mills having smaller size wheels can be used instead of circular saws that cut a thick kerf.

Another object is to show how narrower band saws can be used that will be easier to maintain than the wide band saws now in use.

Another object is to show that by using saws having small teeth that cut a small chip with each tooth the surface of the board sawn will be smoother than boards that are cut with large conventional teeth that cut a thick chip.

A further object is to show that by enlarging the trailing edge of the holes in the blade the holes are more efficient in pushing the saw dust out of the kerf.

Another object is to show that by chamfering the gullets of the teeth the saw dust will flow from the teeth to the holes in the blade.

A further object is to show that by making the holes oblong and placing their center at an angle of less than ninety degrees with the edge of the blade the saw dust will flow towards the back of the blade.

Another object is to show that by chamfering the edge of the holes that is farthest from the teeth the saw dust will flow out of one hole and into a hole that is farther from the teeth.

A further object is to show that by placing holes and half holes across the width of the blade that both sides of the whole width of the blade acts as a conveyor belt to carry the saw dust out of the kerf.

Another object is to show that by using teeth that cut on only one side of the kerf that a smaller chip will be cut that will not take as much space on the side of the blade.

The accompanying drawings illustrate various embodiments of this invention and the several aspects contemplated to be the best mode of carrying out the invention.

In the drawings:

FIGURE 1 is a schematic outline of a saw in side elevation showing teeth on the edge of the blade, chamfered gullets in front of the teeth to allow the saw dust to flow away from the teeth and holes in the side of the blade with raised surfaces on their trailing edge to carry the saw dust out of the kerf.

FIGURE 2 is an exaggerated schematic section view through section 2—2 in FIGURE 1 showing how the teeth have been swaged wider than the blade, the sharpened gullets in front of the teeth and the raised surface on the trailing edge of the holes to push the saw dust out of the kerf.

FIGURE 3 is a schematic section view through section 3—3 in FIGURE 1, showing a tooth that has been swaged wider than the blade, a hole to carry out the saw dust and the raised surface on the trailing edge of the hole to assist in pushing the saw dust out of the kerf.

FIGURE 4 is a schematic section view through section 4—4 in FIGURE 1 showing how the trailing edge of the hole has been enlarged to better push the saw dust out of the kerf and to assist in guiding the blade in the kerf.

FIGURE 5 is a schematic outline of a saw in side elevation that is similar to FIGURE 1 with the exception that it has more teeth, more holes, and part of the holes are slanted and have one edge chamfered to allow the saw dust to flow to other holes that are farther from the teeth.

FIGURE 6 is a schematic section view through section 6—6 in FIGURE 5 showing a swaged tooth, a sharpened gullet, the raised surface on the trailing edge of the hole, and the sharpened surface on the hole to allow the saw dust to flow to other holes farther from the teeth.

FIGURE 7 is a schematic outline of a saw in side elevation showing how by the use of gullets on the edge of the blade, holes spaced at various distances across the blade, and half holes on the back edge of the blade, the whole width of both sides of the saw acts as a conveyor to push the saw dust out of the kerf.

FIGURE 8 is a schematic outline of a saw in side elevation that is similar to FIGURE 5 the exception being that instead of having swaged teeth alternate teeth are bent so that one tooth will cut on one side of the blade and an adjacent tooth will cut on the opposite side of the blade.

FIGURE 9 is a schematic view showing the teeth in FIGURE 8 enlarged.

FIGURE 10 is an enlarged section view through section 10—10 in FIGURE 8, showing the bent teeth, the sharpened gullet, the raised surface on the trailing edge of the hole, and one of the holes.

FIGURE 11 is a schematic outline of a saw in side elevation showing a blade having bent teeth as shown in FIGURE 8, sharpened gullets in front of the teeth, oblong holes placed at an angle of less than ninety degrees with the edge of the blade, chamfered edges on the edge of all the holes, that is farthest from the teeth, and half holes on the back edge of the blade.

The saw blade 15 in FIGURE 1 has swaged teeth 16, chamfered or sharpened gullets 17, holes 18, and a raised surface 19 on the trailing edge of the holes 18. As shown in FIGURES 2 and 3 the swaged teeth 16 are slightly wider than the raised surface 19.

The operation of the saw blade is as follows. The teeth 16 cut a thin chip from the wood. The thin chip flows past the sharpened gullet 17 and lays between one side of the blade 15 and the kerf that is cut in the wood by the teeth 16. The hole 18 moves to the chip and the raised surface 19, on the trailing edge of the hole, pushes the chip along with other chips out of the kerf that has been cut in the wood.

The method of cutting the wood and disposing of the chip as described above allows the use of a thinner blade. The reason for this is that in the conventional saw most all of the saw dust cut by a tooth has to be held in the gullet of the tooth. This requires the gullet and the tooth be large in size for cutting logs and timbers. A large tooth must be comparatively thick at its base or it will bend in the sawing operation. A tooth that has a thick base must be cut on a blade that is comparatively thick. A thick blade can not flex as much as a thin blade and therefore it must be mounted on band mill wheels that are large in diameter.

At present it is the practice for the larger saw mills, that manufacture lumber, to use band mills that have wheels that are approximately six to eight feet in diameter.

These mills are expensive, difficult to move from one sawing location to another, and it requires a very skilled filer to maintain the wide blade. The result is that many of the smaller saw mills use circular saws that cut a kerf that is approximately five sixteenths inch thick. Cutting a thick kerf wastes considerable lumber.

The saw shown in FIGURE 1 does not have as large a gullet as conventional saws and therefore the blade can be thinner. A thinner blade can be used on a band mill that has smaller diameter wheels. Smaller band mills will be much cheaper than larger mills, they can be moved easier from one sawing location to another, they cut more accurate lumber than circular saws, and the blade can be narrower and easier to maintain than a wide blade.

It appears on some sawing operations the raised surfaces 19 on the trailing edge of the holes 18 will not be necessary. These surfaces perform two functions. Being wider than the blade they prevent saw dust from packing between the sides of the blade and the sides of the kerf. By eliminating packing of the saw dust between the blade and kerf, friction in moving the blade through the kerf is reduced. The raised surfaces 19 also assist in supporting the teeth when teeth cut one side of a knot. The way they support the teeth is by bearing against one side of the kerf and preventing the blade from bending. The raised surfaces 19 are at ninety degrees to the direction the blade moves and therefore they do not interfere with the blade flexing in traveling around a band mill wheel. The band mill wheel can have a rubber composition covering. This will accommodate the raised surfaces 19.

The teeth 16 in FIGURE 1 are spaced at a smaller distance from each other than the large teeth on conventional saws. It is the intention that these teetch cut a smaller chip than conventional saws thereby reducing the clearance required on the sides of the blade. A saw that cuts a smaller chip will cut a smoother surface on the board. At present some of the large teeth in conventional saws become bent in the sawing operation. The bent teeth make deep saw marks in the sawing surface that requires extra wood to be removed from the sawn board to dress or plane the board smooth. The saws in this application therefore reduces saw dust waste by cutting a thinner kerf and reduce the amount of wood that has to be removed to make the board smooth.

The chamfered gullets 17 can be sharpened by grinding or by compressing the metal in a press. The chamfering is done to make it easy for the chips to flow away from the teeth. Saws are moved at a surface speed of 10,000 feet per minute. At this speed a tooth will pass through a log in approximately 1/100 of a second. It is therefore necessary that the saw gullet be pointed to prevent any obstruction that would cause the saw dust to pack in the gullet and prevent the tooth from cutting the wood.

It is difficult to swage thin saw teeth so that they are wider than the blade by the usual methods. One method to eliminate this difficulty is to heat the tooth and compress the end when the tooth is red hot. In a later operation the tooth can be hardened by carburizing or by some other heat treating process.

The blade shown in FIGURE 5 is similar to the blade shown in FIGURE 1. The teeth 20 are similar to the teeth in FIGURE 1 except that the distance between the teeth is smaller. The center lines of the holes 21 are less than 90 degrees with the edge of the blade. This causes the raised surface 22 on the trailing edge of the blade to push the saw dust towards the back of the blade. The edge of the hole 23 that is farthest from the wood surface being cut is sharpened. This is shown in FIGURE 6. The sharpened edge 23 allows the saw dust to flow out of hole 21 and pass into hole 24. Hole 24 has raised surfaces 25 that are similar to 22. The raised surfaces 25 assist in pushing the saw dust out of the kerf.

The operation of the blade in FIGURE 5 is as follows. The teeth 20 cut the wood. The saw dust flows past the sharpened gullets 17 to the sides of the blade. Raised surface 22 pushes the saw dust out of the kerf and towards the back of the blade. The sharpened surface 23 allows the saw dust to flow out of the hole 21. The saw dust that flows out of the hole 21 is picked up by hole 24, and raised surface 25 pushes the saw dust in hole 24 out of the kerf.

The main advantage of the blade shown in FIGURE 5 over the blade shown in FIGURE 1 is that it has more teeth and more holes to convey the saw dust out of the kerf. On some operations this could reduce the thickness of the kerf and the friction to pull the blade through the kerf.

FIGURE 7 has teeth similar to FIGURE 5. The blade has holes 26, 27, and 28, and half holes 29 on the back edge of the blade. Hole 26 has a sharpened edge 30 that is similar to the sharpened edge 23 in FIGURES 5 and 6. Hole 27 has a sharpened edge 31 that is similar to 30. Hole 28 has a sharpened edge 32 that is similar to the sharpened edge 30. The trailing edges 33, 34, and 35 on the holes 26, 27, and 28 are not shown raised as 22 in FIGURES 5 and 6. It is believed that for some sawing operations the raised surface would not be necessary. The raised edge could be incorporated in the blade if required.

The operation of the blade in FIGURE 7 is as follows. The teeth 20 cut thin chips from the wood. The chips flow past the chamfered gullet 17 and into the clearance between the blade and the kerf. The slanted surface 33 pushes the saw dust out of the kerf and towards the back of the blade. Some of the saw dust flows past the sharpened surface 30 on the hole 26 and is picked up by the hole 27. The slanted surface 34 pushes the saw dust out of the kerf and towards the back of the blade. Some of the saw dust flows past the sharpened surface 31 and is picked up by the hole 28. The slanted surface 35 pushes the saw dust out of the kerf and toward the back of the blade. Some of the saw dust flows past the sharpened surface 32 and is picked up by the half holes 29. The slanted surface 36 on the half holes pushes the saw dust out of the kerf and into the kerf that is back of the blade.

It will be observed in FIGURE 7 that the combination of gullets, holes, and half holes provide a means of making the whole width of both sides of the blade a conveyor to carry out the saw dust cut by the teeth. The width of the blade represented by the distance 37 has the saw dust carried out by the gullets in front of the teeth 20. The distance 38 has the saw dust carried out by the holes 26. The distance 39 has the saw dust carried out by the holes 27. The distance 40 has the saw dust carried out by the holes 28. The distance 41 has the saw dust carried out by the half holes 29.

The blade shown in FIGURE 8 is similar to the blade shown in FIGURE 5. The main difference is the teeth 42 and 43 are bent instead of swaged. This is shown in FIGURE 10. Teeth 43 cut one side of the blade and teeth 42 cut on the opposite side of the blade. The saw dust cut by teeth 43 flows past the sharpened gullet 44 and into holes 45. The saw dust cut by teeth 42 flows past the sharpened gullet 46 and into holes 45. The trailing edge of holes 45 has a raised surface that is divided into three sections 47, 48, and 49. The purpose of breaking the raised surface into three sections is to allow the blade to flex more when mounted on a small diameter band mill wheel. The raised surfaces 47, 48, and 49 push the saw dust out of the kerf and towards the back of the blade. The holes 45 have sharpened edges 50 that allows the saw dust to flow out of the holes. Holes 51 pick up the saw dust that flows out of the holes 45 and raised surfaces 52 push the saw dust out of the kerf.

The advantage of the blade shown in FIGURE 8 over the blade shown in FIGURE 5 is that it is easier to bend a tooth than it is to swage it and the bent tooth cuts a smaller chip. The advantage of cutting a smaller chip is that it does not require as much clearance space on the side of the blade.

The blade shown in FIGURE 11 has the same bent teeth as shown in FIGURE 8 and it has holes and half holes spaced across the width of the blade, as in FIGURE 7, to convey the saw dust out of the kerf. The blade has holes 53 with sharpened edges 54 and holes 55 with sharpened edges 56. On the back edge of the blade it has half holes 57.

The method of cutting and chip flow in the blade shown in FIGURE 11 is as follows. Teeth 43 cut wood chips on the center and one side of the kerf. Teeth 42 cut chips on the opposite side of the kerf. The chips from teeth 43 flow past the sharpened gullet 44 and into the space between one side of the blade and one side of the kerf. The chips cut by teeth 42 flows past the sharpened gullet 46 and flows into the space between the opposite side of the blade and the kerf. As the saw dust on the sides of the blade increases in volume it is picked up by the holes 53. The slanting surface 58 on the trailing side of the holes 53 push the saw dust in the hole 53 out of the kerf and towards the back of the blade. Some of the saw dust flows past the sharpened surface 54 on the holes 53 to the side of the blade. The holes 55 pick up the saw dust that flowed out of holes 53 and slanting surface 59 pushes the saw dust out of the kerf and towards the back of the blade. Some of the saw dust flows past the sharpened surface 56. The half holes 57 pick up this saw dust and the slanting surface 60 pushes the saw dust into the kerf at the back of the blade.

The blade in FIGURE 11 uses both of its sides to convey the saw dust out of the kerf. The width of the blade is represented by the distances 61, 62, 63, and 64. The saw dust is conveyed out of the width represented by distance 61 by the gullet in front of the teeth 43. The width of the blade represented by the distnace 62 has the saw dust conveyed out of the kerf by holes 53. The width of the blade represented by distance 63 has the saw dust conveyed out by holes 55. The remaining width of the blade represented by the distance 64 has the saw dust conveyed out by the half holes 57.

The clearance on the side of the blade will depend partially on the thickness of the chip cut. The thicker the chip the larger will be the amount of clearance required. In some cutting operations it may be profitable to operate the blade at a high speed and cut a very thin chip.

It is believed that some of the saws shown above will reduce the maintenance cost of the saw blade. At present the wide band saw blades are expensive and as they wear they require a very skilled man to roll and hammer the correct amount of tension into the blade. The large circular saws also have to be tensioned by the hammering process. In contrast to the above the narrow band saws used for metal cutting are purchased at a low cost, used and thrown away. Some of the saws described above could also be made in volume at a low cost, used and thrown away.

Reducing the amount of saw dust cut by using a thinner blade will be advantageous to the small saw mill. Many small saw mills only have one circular saw that cuts a five-sixteenth inch kerf. When thin boards are cut with this saw they waste considerable lumber. It seems that many small saw mills would find it profitable to use a small size band mill with one of the blades described above to cut the thinner boards.

The large saw mills can also profit by using small band mills. Many large mills only have one large resaw, that uses a wide blade, to cut timbers into boards. Instead of one large resaw the large saw mill could use several small resaws operated by one man with electric controls. The small resaws would cut less saw dust and thereby conserve lumber. On some operations several small resaws controlled by one man could cut more lumber than a single large resaw. In this way labor cost would also be reduced.

In conclusion it is believed the above saws will reduce saw dust waste by cutting a thinner kerf, reduce the amount of wood that has to be removed to dress the wood, cut a smoother surface on the board, make it possible to use smaller size band mills for sawing lumber, reduce the cost of the blade, reduce the cost of maintaining the blade, and where it is possible to operate several band mills by remote control reduce the labor cost of sawing.

Various embodiments of the invention may be employed within the scope of the accompanying claims which particularly point out and distinctly set forth the subject matter regarded as the invention.

I claim:

1. The method of sawing a board from a thick section of wood, comprising cutting wood chips to make a kerf with teeth on the edge of a blade that are moving at a speed of over 5,000 feet per minute, the step of directing the flow of said chips to the sides of said blade by means of chamfered gullets, accumulating part of said chips in through holes in said blade and conveying said chips out of the kerf with said through holes in the side of the blade whereby using this method to cut timbers of the same thickness a thinner more flexible blade with smaller gullets can be used on smaller diameter band mill wheels than can be used by present band mills which use blades with unsharpened gullets.

2. The method described in claim 1 in which at least part of the chips that lie in the space between the sides of the blade and the kerf are pushed out of the kerf with raised surfaces on the trailing side of at least part of the through holes in said blade whereby using said raised surfaces the through holes will carry more saw dust out of the kerf and when the blade is used on a rubber covered band mill wheel the raised surfaces will bite into the rubber to provide more traction.

3. The method described in claim 1 in which is added the step of guiding the blade by the use of raised surfaces on the edges of at least part of the through holes that contact the side of the kerf when the blade bends whereby more accurate lumber can be cut than when the blade has no raised surfaces on its side to prevent the blade from bending in the kerf.

4. The method described in claim 1 in which the wood chips are conveyed out of the kerf and towards the back of the blade by the step of transferring the saw dust from one through hole to another through hole by the use of slanting abutment surfaces on oblong through holes that push the chips in a direction the blade is moving and towards the back edge of the blade.

5. The method of sawing a board from a larger section of wood, comprising cutting wood chips with teeth on the edge of the blade, the step of pushing said chips past sharpened gullets to the sides of the blade, accumulating part of said chips in through holes in said blade, the step of transferring the saw dust from one through hole to a through hole farther from the teeth and conveying said chips out of the kerf with said through holes.

6. The method of cutting boards from timbers with band mills that are smaller than normally used, comprising cutting wood chips to make a kerf with small teeth on the edge of a blade that move at a speed of over 5,000 feet per minute, the step of directing the flow of said chips to the sides of said blade by means of chamfered gullets, accumulating part of said chips in through holes in said blade conveying said chips out of the kerf with said through holes in the side of said blade, and the step of moving the blade by a band mill having wheels smaller in diameter than is required for a band mill which uses a saw with unsharpened gullets to carry the same amount of saw dust out of the kerf that can be used to cut wood at a speed of 10,000 feet per minute whereby using said method small saw mills that now use thick circular saws can use smaller size band mills that cost less, are more portable, waste less lumber in saw dust, and use less expensive blades.

7. A saw for cutting boards from timbers and logs, comprising a blade, said blade having teeth on an edge that can be used to cut wood at a speed of 10,000 feet per minute, said teeth having sharpened gullets that provide means for the saw dust to flow from the teeth to the sides of the blade, said sharpened gullets being smaller than non-sharpened gullets used for cutting timbers of the same thickness, said blade being thinner than blades which have non-sharpened gullets and cut the same thickness of timber whereby the blade can flex more and be used on smaller diameter band mill wheels than the present band mills which use blades with unsharpened gullets, and said blade having through holes on its side that provide means of accumulating part of the saw dust cut by the teeth and carrying the saw dust out of the kerf.

8. The construction of claim 7 in which the through holes in the side of the blade are located at various distances from the cutting edge of the teeth whereby the holes being at different distances from the teeth it will be difficult for saw dust to accumulate between the blade and kerf and a thinner kerf can be cut.

9. The construction of claim 7 in which at least part of said through holes are oblong and have slanting surfaces that push the saw dust out of the kerf and towards the back edge of the blade.

10. The construction of claim 7 in which part of the teeth are bent to cut on one side of the blade and part of the teeth are bent to cut on the opposite side of the blade whereby smaller chips are cut that do not take as much space on the sides of the blade as chips cut by teeth that cut the same thickness of the kerf.

11. The construction of claim 7 in which the whole width of the blade has means to convey the saw dust out of the kerf, said means to consist of gullets in front of the teeth, through holes in the side of the blade and half holes on the back edge of the blade.

12. The construction of claim 7 in which the distance from a line connecting the tops of two cutting teeth to a bottom of a gullet is approximately the same distance as an edge of at least part of the through holes is from the same line whereby the blade has the advantage of having small gullets that will allow the blade to be thin and holes close to the teeth to carry out the saw dust.

13. A saw for cutting wood, comprising a blade, said blade having teeth on an edge that can be operated at a conventional band mill speed, said teeth having sharpened gullets that provide means for the saw dust to flow from the teeth to the sides of the blade, said blade having through holes on its side that provide means for accumulating part of the saw dust cut by the teeth and at least part of said through holes having a raised surface on the trailing edge of the hole thereby providing a more efficient means of removing saw dust from the kerf and reducing the amount the blade can be bent in the kerf.

14. A saw for cutting wood, comprising a blade, said blade having teeth on an edge that can be operated at a conventional band mill speed, said teeth having sharpened gullets that provide means for the saw dust to flow from the teeth to the sides of the blade, said blade having through holes on its side that provide means for accumulating part of the saw dust cut by the teeth and at least part of said through holes having chamfered surfaces on the edge of the hole farthest from the teeth thereby providing means for the saw dust to flow towards the back of the blade.

References Cited by the Examiner

UNITED STATES PATENTS

| | | | |
|---|---|---|---|
| 495,345 | 4/1893 | Junge et al. | 143—133 |
| 521,341 | 6/1894 | Hazard | 143—133 |
| 746,686 | 12/1903 | Dennison | 143—138 |
| 822,056 | 5/1906 | Knox | 143—133 |

FOREIGN PATENTS

| | | |
|---|---|---|
| 164,418 | 8/1955 | Australia. |
| 1,093,674 | 11/1954 | France. |
| 11,891 | 1892 | Great Britain. |

DONALD R. SCHRAN, *Primary Examiner.*

WILLIAM W. DYER, JR., *Examiner.*